Feb. 10, 1931.　　　P. T. WHEATON ET AL　　　1,791,545
COVERING FOR LAMINATED SPRINGS
Filed Nov. 19, 1927　　3 Sheets-Sheet 1
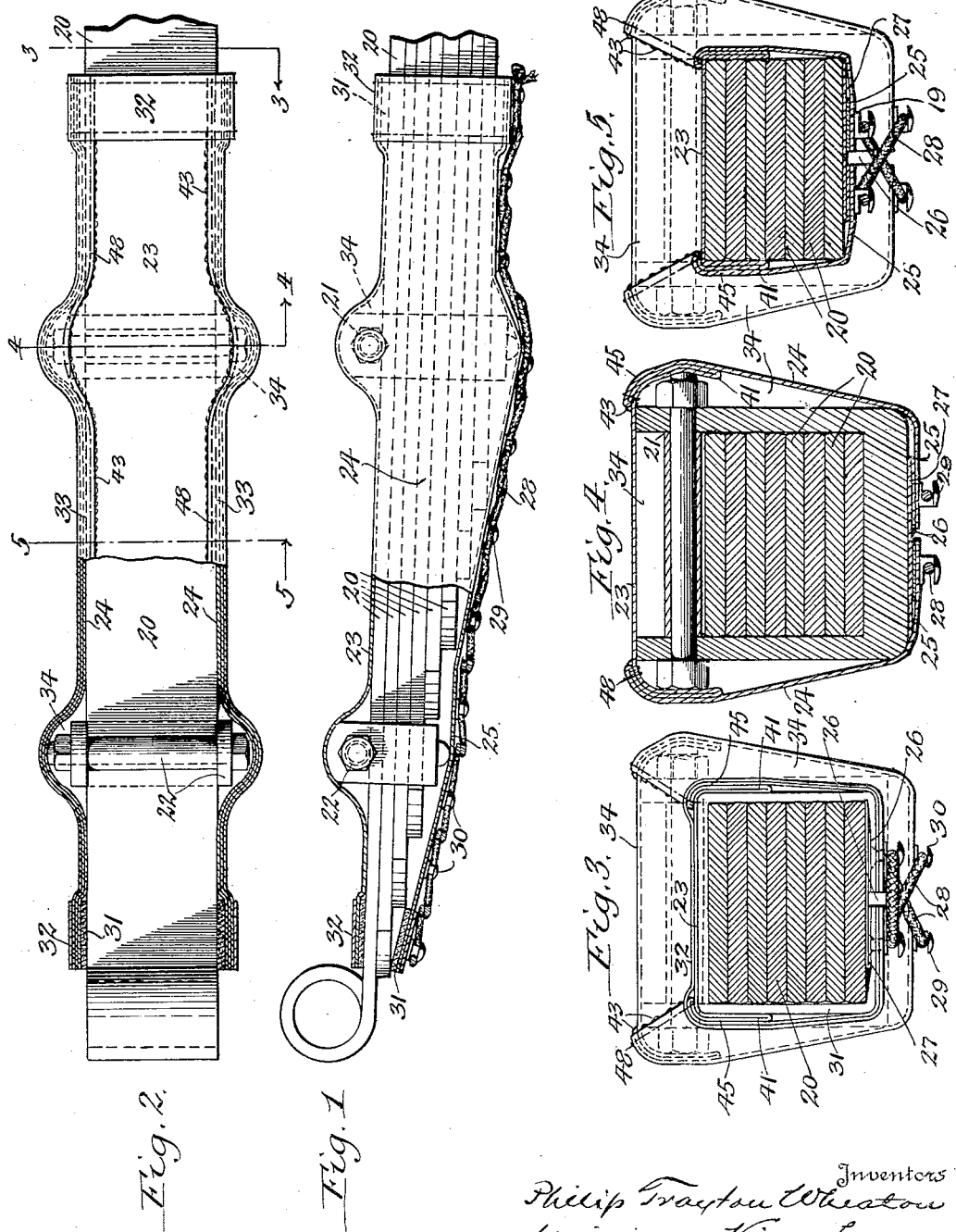

Feb. 10, 1931. P. T. WHEATON ET AL 1,791,545
COVERING FOR LAMINATED SPRINGS
Filed Nov. 19, 1927 3 Sheets-Sheet 2
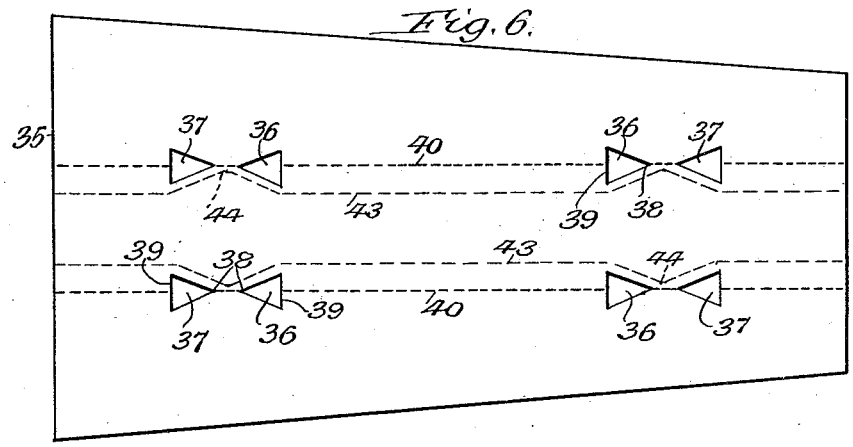
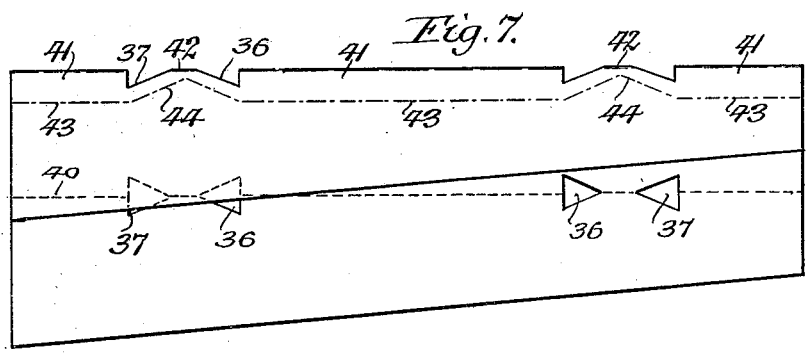
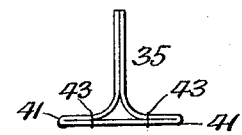
Inventors
Philip Trayton Wheaton
William Kinghorn
By Poff & Powers
Attorneys

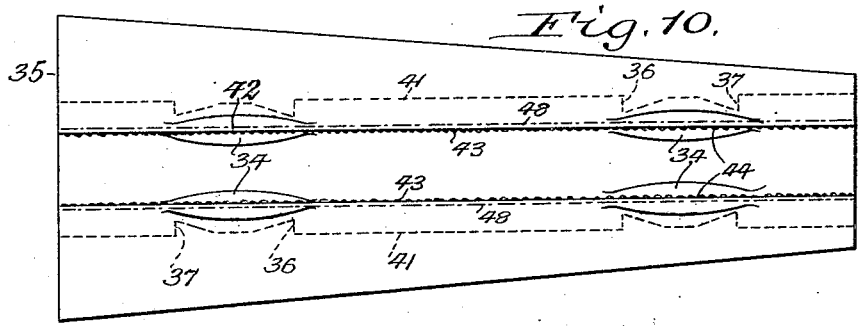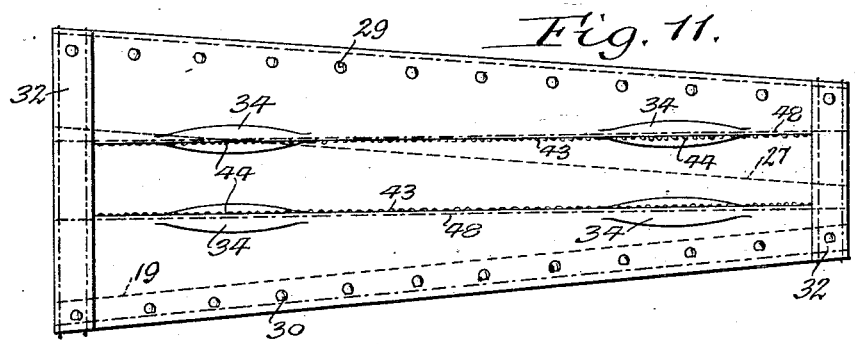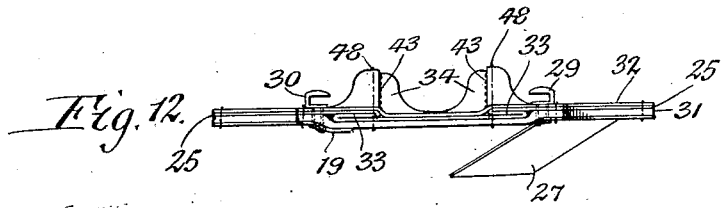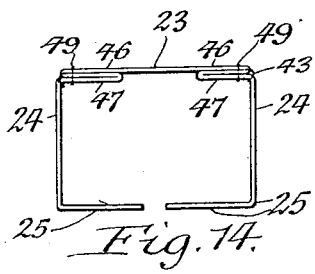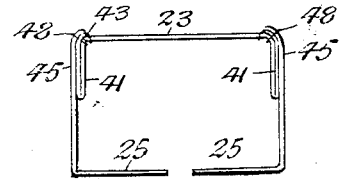

Patented Feb. 10, 1931

1,791,545

UNITED STATES PATENT OFFICE

PHILIP TRAYTON WHEATON AND WILLIAM KINGHORN, OF BUFFALO, NEW YORK, ASSIGNORS, BY MESNE ASSIGNMENTS, TO McKINNON DASH COMPANY, OF BUFFALO, NEW YORK, A CORPORATION OF NEW JERSEY

COVERING FOR LAMINATED SPRINGS

Application filed November 19, 1927. Serial No. 234,314.

This invention relates to a covering boot, or casing for vehicle springs and more especially automobile springs which comprise laminated or multiple spring leaves which are connected by a rebound clip to prevent them from separating during rebound of the spring.

One of the objects of this invention is the provision of a device of this character which efficiently encases the spring in order to protect the same by eliminating dirt, dust, rust and the elements, the presence of which have a retarding effect upon the action of the spring, thereby keeping the spring clean and reducing the necessity of lubricating the springs to a minimum.

Another object of this invention is to provide a casing or cover for vehicle or automobile springs which is provided with a triple longitudinal welt, preferably sewed, which forms a reinforced pocket adjacent to a rebound clip and insures a perfectly fitting casing for the spring and eliminating the awkward, bulky and unsightly appearance usually presented by spring casings as heretofore constructed.

A further object of this invention is to provide a casing or cover for vehicle and automobile springs in which the sheet of pliable material is sewed in such manner as to completely enclose the spring and thus preclude the necessity of cutting the main body of the casing to allow the rebound clip of the spring to protrude sufficiently to obtain a neat fitting casing.

With the above objects in view, this invention consists of the combination and arrangement of parts as hereinafter set forth, it being understood that changes in the embodiment of the invention herein shown may be made within the scope of the appended claims without departing from the essence of this invention.

In the accompanying drawings:—

Figure 1 is a side elevation, partly in section, of a cover embodying this invention and applied to a laminated spring.

Figure 2 is a top plan view of the same, partly in section.

Figures 3, 4, and 5 are vertical transverse sections taken on the correspondingly numbered lines in Fig. 2.

Figure 6 is a plan view of the blank of the body forming part of the cover.

Figure 7 is a similar view showing the position of the parts when sewing one of the longitudinal welts.

Figure 8 is an end view of the cover in the partly completed form shown in Fig. 7, in which one of the welts is sewed by one row of stitches on the underside of the body.

Figure 9 is a similar view showing both welts stitched on the underside of the body.

Figure 10 is a top plan view of the cover showing another stage in the manufacture of the same.

Figure 11 is a top plan view of the completed cover.

Figure 12 is an end view of the same.

Figure 13 is an enlarged view of the cover body showing the welts arranged to extend along the sides of the spring.

Figure 14 is a similar view showing the welts arranged to extend over the top of this spring.

Similar characters of reference indicate like parts in the several figures of the drawings:—

The spring cover forming the subject of this invention may be constructed in various forms so as to adapt the same for springs which vary in shape and also springs in which the laminated or multiple leaves are connected by one or more clips for preventing the leaves from being separated during a rebound action of the spring.

The spring shown in the drawings as an example of one adapted to receive a cover constructed in accordance with the present invention consists of a plurality of superposed spring leaves 20 which are of progressively greater length, in that the spring as a whole tapers toward the outer end thereof, and are adapted to be connected respectively with the axle and frame of the vehicle or automobile, and two rebound clips connecting the leaves of the spring at different points in the length thereof, the inner clip 21 being comparatively long and embracing all the spring leaves while the outer clip 22 is comparatively short and only embraces or surrounds a part of the leaves constituting the spring.

The body of the cover may be constructed of leather or any other suitable sheet-like or fabricated pliable material and in its general organization comprises a top or upper horizontal wall 23 adapted to extend over the top of the spring, two sides or vertical walls 24, 24 adapted to extend from opposite longitudinal edges of the top wall 23 downwardly along the opposite upright sides of the spring, and two horizontal wall sections or flaps 25 adapted to extend inwardly from the lower longitudinal edges of the side walls 24 along the underside of the spring.

In order to close the longitudinal joint or gap 26 which is formed between the opposing meeting edges of the lower flaps 25, a tongue 27 is provided, one edge of which is secured to the inner side of one of the flaps 25 while its opposite free edge is adapted to lap over the inner side of the other flap 25 with which the same is connected, this last-mentioned flap being provided along the inner side of its longitudinal edge with a protecting or wearing strip 19 of suitable fabric or material for engagement with the free edge of the tongue 27, as best shown in Fig. 4, and thus bridge the joint between the flaps 25 and thereby exclude any dirt, dust or other elements from the interior of the cover and also confine within the cover the grease or other lubricant which has been placed therein, for the purpose of lubricating the opposing surfaces of the leaves of the spring.

This covering is drawn tightly around the spring so as to completely enclose the same, and provides a neat fit and also prevents the entrance of the elements and the escape of lubricant by employing fastening or tightening means which in their preferred form consist of a lacing 28 which connects lace hooks 29, 30 arranged on the outer side of the opposing longitudinal inner edge portions of the flaps 25, as shown in Figs. 3, 4, and 5.

In its general form the body of this covering, when applied to a spring of this character, has the form of an outwardly tapering tube which is of substantially rectangular form in cross section, so as to readily adapt the same to the shape of the spring.

At its opposite ends the body of this cover is provided on its inner side with transverse strips or bands 31 of felt or similar material which are adapted to bear tightly against the adjacent parts of the spring, and thereby act as grease or oil retainers after the cover has been laced to the spring, and thus insure exclusion of dirt or dust as well as properly lubricating the spring leaves so that they will slide freely one upon another without undue wear or producing any squeaky noise.

At opposite ends of the body of the spring cover the same is also provided with transverse reinforcing strips 32 of leather or similar material which aid in confining the end portions of the cover firmly against the spring and thereby preclude the escape of grease or other lubricant at these points. These internal packing bands or strips and external reinforcing strips are preferably sewed on the adjacent part of the body of the cover by the same row of stitches so as to simplify the construction and reduce cost, but if desired, these members may be connected with each other in any suitable manner.

Adjacent to the longitudinal upper corners of the spring the same is provided with longitudinal reinforced shoulders 33 which are adapted to engage the adjacent parts of the multiple leaf spring and thereby prevent undue wear of the covering and insure longer life of the same, and adjacent to the upper part of each of the clips this covering is provided with a pocket 34 which is adapted to receive the upper part of the respective clip which projects from the spring and thereby provides the necessary increase in width or size of the covering at this point, so as to permit the latter to clear the clips and enable the covering as a whole to be fitted tightly against the spring and produce a neat appearance of the assembly as a whole.

In the manufacture of this covering whereby these shoulders and pockets are produced, the method of procedure is preferably as follows:—

In the tapering blank 35 consisting of a sheet of pliable material, two openings 36, 37 preferably of triangular form are provided lengthwise side by side adjacent to that part of the covering which is adapted to fit over the upper outer corner of one of the rebound clips, as shown in Fig. 6, these openings of each pair being preferably so arranged that the same have two of their corresponding angles 38 extending inwardly and facing each other, while two of their corresponding outer straight sides 39 are arranged transversely of the covering. When this covering is intended for use on a spring having two rebound clips, as shown in the drawings, the blank 35 is provided adjacent to its opposite ends with two pairs of openings 36, 37 for the two corresponding corners of each clip.

The pliable blank of the covering body is next provided with two longitudinal creases 40, 40 each of which extends centrally through the two pairs of openings 36, 37 which are formed in the blank preparatory to completing that part of the pocket which receives the corresponding corners of both clips.

In order to produce this crease, each half of the blank 35 is folded in the manner shown in Figs. 7 and 8 so that a longitudinal pleat is formed on the respective part of the blank and each opening formed in line with the respective crease 40 of this blank is doubled upon itself so as to virtually form a notch in this pleat, as shown in Fig. 7. The pleat thus formed consists of main sections 41 arranged lengthwise of the blank from the outer or transverse edges 39 of the openings 36, 37 and intermediate sections 42 each arranged between the opposing inner ends of the double openings 36, 37 of the pair.

In order to complete these pleats and render the same permanent the two plies of material formed by folding together the blank are connected at the base thereof by any suitable means, for instance by a longitudinal row of stitches or sewing 43, and in order to form the pockets 34 within this pleat along the inner sides of the intermediate parts 42 of this pleat, a connection is formed between the plies of the pleat along the sides of the respective openings 36, 37 which connection is preferably arranged farther outwardly from the base of the pleats than the row of stitches 43, said connection between the plies of the pleat along the sides of the openings 36, 37 being preferably effected by a row of stitches or sewing 44 which forms a continuation of the row of stitches 43. After one half of the body blank has been thus creased and stitched to form the pleats and the pockets therein, as shown in Fig. 6, the other side or half of the cover blank is similarly sewed or stitched so as to form the corresponding longitudinal pleat and pockets on the other side of the blank, as shown in Fig. 7.

The blank is now folded along the base of each of the pleats 41, 42 so that the latter lies against the inner side of the blank and produces an additional longitudinal outer pleat on the outer side of the blank so that the material is folded or doubled twice upon itself lengthwise along each half of the covering. This results in the formation of a welt having a triple thickness of material and constitutes a shoulder which is adapted to bear against the adjacent part of the upper corner of the spring.

These additional outer pleats may be arranged vertically adjacent to the upper parts of the upright sides of the spring, as shown at 45 in Fig. 13, and the companion inner pleats 41 are arranged vertically and are adapted to bear against the adjacent upright parts of the spring. If desired the outer pleats 46 may be arranged horizontally on the upper part of the covering and the corresponding inner pleats 47 may also be arranged horizontally and rest upon the upper sides of the spring, as shown in Fig. 14.

For the purpose of retaining the inner pleats 41 in a downwardly folded position against the side wall portion of the covering and thus facilitate the application of the covering to a spring an additional row of auxiliary stitches, sewing or similar fastening 48 is employed which connects the plies of the inner pleat 41 adjacent to the inner side of the base thereof with the summit of the companion outer pleat 45, thereby holding the inner pleat 45 flatwise against the adjacent side wall of the covering without the necessity of stitching the summit of the inner pleat to the companion side wall of the covering, as shown in Fig. 13. The same effect is produced in case the double pleats forming the triple ply welt are arranged over the spring, by employing auxiliary longitudinal rows of stitches 49, each of which connects one of the inner pleats 47 adjacent to the base of its plies with the summit portion of the companion outer pleat 46, as shown in Fig. 14.

These longitudinal auxiliary stitches 48, 49 extend not only lengthwise alongside of the main stitches 43 which are arranged at the base of the plies forming the inner pleats 41, 47 but they also extend along the rows of stitches 44 connecting the notches or perforated portions of the plies which form the pockets for the reception of the rebound clips, as shown in Figs. 11 and 12.

A spring protecting covering or casing is thus fabricated from leather or other suitable material in which the top is provided with triple thickness shoulders for engaging the upper corners of the spring leaves, and the clips and pockets are provided for receiving the upper projecting parts of the clips which completely and efficiently enclose the spring. Furthermore, the openings, preferably of triangular form which are cut in the blank at a plurality of points adjacent to each clip, permit of fitting the covering to the spring so as to effectively relieve any strain on that part of the cover which extends over the clips when the covering is laced on the spring and also insures a proper and neat fit of the cover over the spring leaves and the clips. Moreover, by forming each of the shoulders of the covering of two pleats which project in opposite directions, a triple ply or thickness of this material is formed which constitutes a triple ply welt or shoulder on the covering where the same engages the spring and thus increases the durability of the same and permits of sufficiently increased life, thereby preventing wear on the same which would permit the entrance of dust into the casing or the escape of lubricant therefrom.

An additional advantage in this construction is that the triple ply welts or shoulders on the covering may be arranged either on top the spring or at the sides of the same and thereby permits of readily adapting this covering to various forms of spring equipment and provides adequate clearance pockets on the covering which are sufficiently great in circumference adjacent to the points where the rebound clips are located that the covering can be properly fitted to these clips and the spring leaves so as to maintain a neat appearance and yet assemble the parts sufficiently tight so as to effectively exclude all extraneous material which might operate injuriously on the springs and also retain the lubricant within the covering so as to avoid undue wear and eliminate all noise.

We claim as our invention:—

1. A covering for a laminated leaf spring provided with a rebound clip, comprising a sheet of pliable material adapted to enclose said spring and provided along a longitudinal corner of the spring with a pleated portion which contains a laterally extending pocket continuous with the cover and adapted to receive a rebound clip, and stitching connecting the plies of said pleated portion and extending continuously along the base of the plies forming said pleated portion and also outwardly along the summit of said pleated portion which contains said pocket.

2. A covering for a laminated leaf spring provided with a rebound clip, comprising a sheet of pliable material adapted to enclose said spring and provided along a longitudinal corner of the spring with a pleated portion which contains a laterally extending pocket continuous with the cover and adapted to receive a rebound clip, and stitching connecting the plies of said pleated portion and extending continuously along the base of the plies forming said pleated portion and also outwardly along the summit of said pleated portion which contains said pocket, those parts of the pleated portion on opposite sides of the summit of said pocket being provided with openings.

3. A covering for a laminated leaf spring provided with a rebound clip, comprising a sheet of pliable material adapted to enclose said spring and provided along a longitudinal corner of the spring with a pleated portion which contains a laterally extending pocket continuous with the cover and adapted to receive a rebound clip, and stitching connecting the plies of said pleated portion and extending continuously along the base of the plies forming said pleated portion and also outwardly along the summit of said pleated portion which contains said pocket, those parts of the pleated portion on opposite sides of the summit of said pocket being provided with openings of triangular form and corresponding apices of said openings opposing each other.

In testimony whereof we hereby affix our signatures.

PHILIP TRAYTON WHEATON.
WM. KINGHORN.